Dec. 27, 1966   L. L. TIPTON ETAL   3,294,976
UNBALANCED LOAD DETECTION IN ALTERNATING CURRENT SYSTEMS
Filed Feb. 27, 1964   2 Sheets-Sheet 1

WITNESSES:
John L. Chopp
James F. Young

INVENTORS
Lynn L. Tipton and
James F. Heins
BY
ATTORNEY

Dec. 27, 1966    L. L. TIPTON ETAL    3,294,976
UNBALANCED LOAD DETECTION IN ALTERNATING CURRENT SYSTEMS
Filed Feb. 27, 1964    2 Sheets-Sheet 2
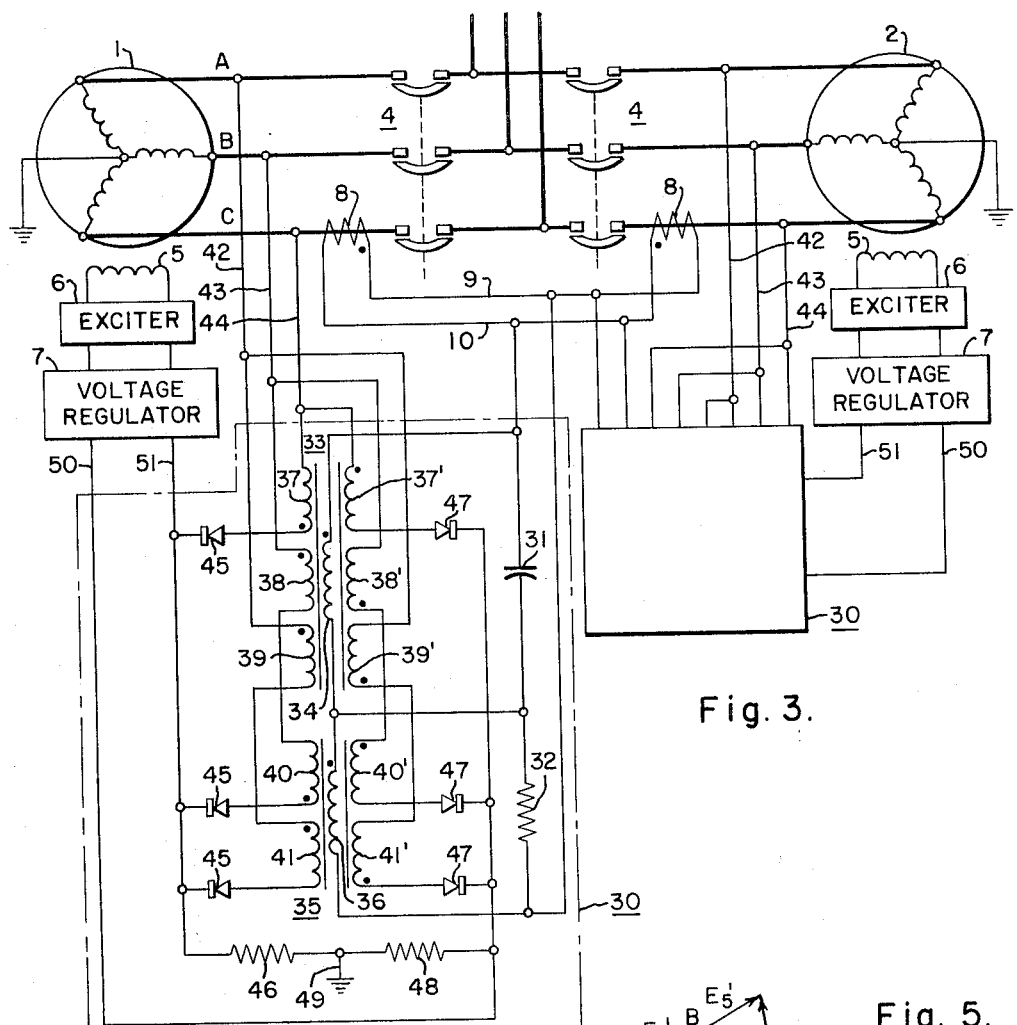
Fig. 3.
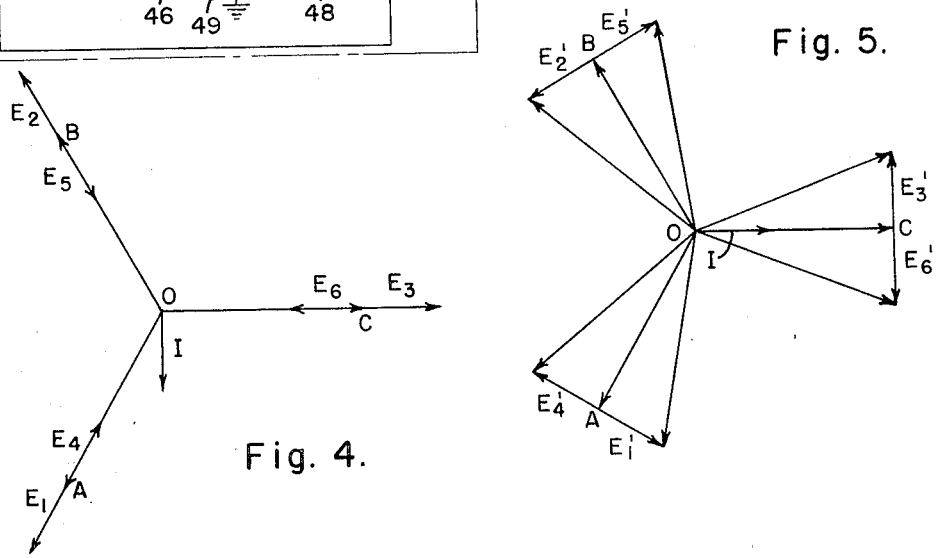
Fig. 4.
Fig. 5.

United States Patent Office 3,294,976
Patented Dec. 27, 1966

3,294,976
UNBALANCED LOAD DETECTION IN ALTERNATING CURRENT SYSTEMS
Lynn L. Tipton and James F. Heins, Lima, Ohio, assignors to Westinghouse Electric Corporation, Pittsburgh, Pa., a corporation of Pennsylvania
Filed Feb. 27, 1964, Ser. No. 347,812
13 Claims. (Cl. 307—57)

The present invention relates to the detection of unbalanced load in alternating current power systems having a plurality of power sources operating in parallel, and more particularly to a load division sensing circuit for detecting unbalance of reactive load in such systems.

In alternating current power systems having two or more generators or other power sources operating in parallel, means must be provided for maintaining proper division of both real and reactive load between the generators, and for providing protection against sustained unbalance of either real or reactive load. Division of real load between the generators, and thus proper division of load between their prime movers, can be maintained by proper control of the prime movers. Division of reactive load between the generators, however, is determined by the excitation of the machines, and if one generator becomes overexcited or underexcited it will tend to take more or less than its share of the load. Proper division of reactive load, therefore, can be maintained by controlling the voltage regulators of the generators to control their excitation to maintain the proper load division. Sustained unbalance of reactive load is an indication of an uncorrected excitation fault and can be used as an indication of such a fault to effect the necessary protective action.

In many parallel systems, such as those used on aircraft for example, a current transformer loop is utilized to provide a signal current proportional to the difference in load currents of the generators supplying the system. A suitable sensing means or sensing circuit actuated by this signal current is provided for each generator and responds to reactive load unbalance to control the generator voltage regulator to change the excitation in the proper direction to maintain the proper load division. Such circuits can also be used to control protective relays to respond to sustained reactive load unbalance indicating an excitation fault. Various types of sensing circuits have been used for this purpose. Thus, as shown in Keith et al. Patent 2,717,318 and Reeder et al. Patent 2,883,561 a mutual reactor or a saturable transformer may be excited from the current transformer loop to provide a signal for modifying the voltage to which the voltage regulator or a protective relay responds in case of reactive load unbalance. Other sensing circuits utilizing phase shifting networks and demodulator circuits have also been used with more or less satisfactory results.

These prior load unbalance sensing circuits have been satisfactory where it is only necessary for the voltage regulator to sense and regulate the average of the three phase voltages of the generator. In many cases, however, it is required that the regulator respond to the highest phase voltage and the known reactive load division systems are not suitable when this type of response is required. It is also sometimes required that the load division sensing circuit provide a direct current output signal which will indicate the direction and magnitude of the unbalance by the polarity and magnitude of the signal. Various other special requirements are sometimes encountered which cannot be met by the prior types of load unbalance sensing circuits. Thus the known circuits, while satisfactory within their limitations, are not universal in application and cannot be used with all types of voltage regulators or regulation requirements, and cannot meet other requirements in all cases.

The principal object of the present invention is to provide a load unbalance sensing circuit for alternating current power systems having a plurality of power sources in parallel which is universally applicable for use with any type of voltage regulator or regulating system to maintain proper reactive load division or to provide protection against real or reactive load unbalance.

Another object of the invention is to provide a load unbalance sensing circuit for alternating current systems which will respond to either real or reactive load unbalance, as desired, and which utilizes a minimum number of components of small size and weight and high reliability.

A further object of the invention is to provide a load unbalance sensing circuit in which the sensitivity to unbalanced load is easily adjustable, and which can be utilized to respond to either real or reactive load unbalance with minimum sensitivity to the other component.

A still further object of the invention is to provide a load unbalance sensing circuit in which a direct current output signal can be obtained with polarity depending upon the direction of the unbalance and with magnitude dependent on the magnitude of the unbalance.

Other objects and advantages of the invention will be apparent from the following detailed description, taken in connection with the accompanying drawings, in which:

FIG. 3 is a schematic diagram showing another embodiment of the invention; and

FIGS. 4 and 5 are vector diagrams illustrating the operation of the circuit of FIG. 3.

Figure 1:
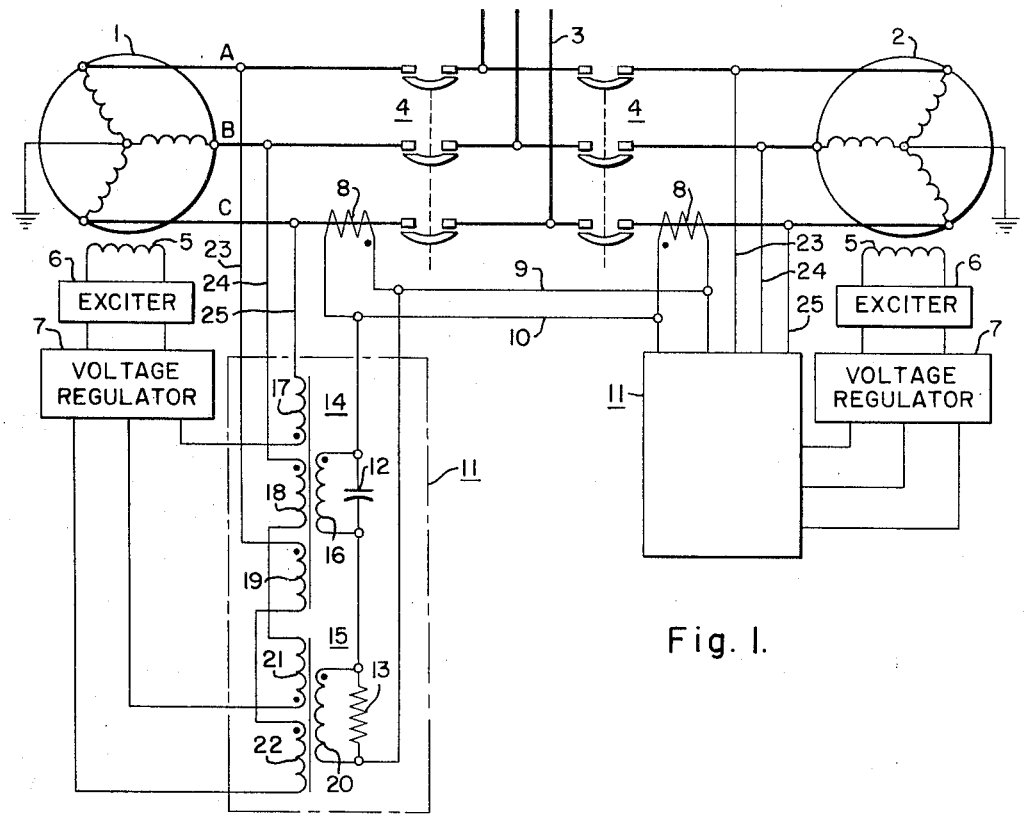
FIGURE 1 is a schematic diagram showing an illustrative embodiment of the invention.

The invention is shown in FIG. 1 applied to a three-phase alternating current system having two three-phase generators 1 and 2 connected in parallel to a load bus 3 by circuit breakers 4, which may be of any suitable type and may be controlled in any desired manner. The generators 1 and 2 are shown as being identical three-phase machines and each machine has a field winding 5 supplied with direct current excitation from an exciter 6 of any suitable type which is controlled by a voltage regulator 7 which may also be of any suitable type. It is to be understood that the excitation system shown is merely illustrative and is to be taken as representing any suitable type of excitation system for supplying direct current excitation to the generator under the control of a regulator of any type which senses the generator voltage and controls the exciter to maintain substantially constant generator voltage. The voltage regulator may, for example, be of the magnetic amplifier type, or it may be of a type utilizing semiconductor components such as transistors or controlled rectifiers, or it may be of the carbon pile or any other desired type.

The generators 1 and 2 have been shown for the purpose of illustration as conventional three-phase generators intended to be driven at constant speed but it is to be understood that any other desired type of alternating current power source might be used, such as a power supply utilizing a static inverter or frequency changer, for example, to provide a constant frequency alternating current output. The generators 1 and 2 therefore are to be taken as representing any desired polyphase power source with regulating or control means for maintaining the desired output voltage and load division. It will also be understood that the invention is not restricted to the simple system shown but may be used in any polyphase system having a number of power sources operating in parallel.

For the purpose of indicating unequal load division between the power sources 1 and 2, a current transformer 8 is provided for each machine. These current transformers are connected in corresponding phases, and are interconnected with additive polarity in a loop circuit by conductors 9 and 10, as shown. Under balanced conditions, when each generator is supplying its proper share of the total load, the current transformer voltages are equal, and no currents can flow in the sensing circuit 11 connected across the loop circuit as shown. Under unbalanced conditions, however, when one generator is supplying more or less than its share of the load, the current transformer voltages become unequal and a signal current proportional to the difference in load currents of the generators will flow in each sensing circuit. This signal current may contain both real and reactive components, or it may consist only of real current or of reactive current, depending upon the nature of the unbalance. The current transformer loop circuit therefore provides a signal current proportional to the difference in load currents of the generators.

In accordance with the present invention, a sensing circuit 11 is provided for each generator responsive to the signal current derived from the current transformer loop circuit to provide an output which is responsive to the presence of reactive current components in the signal current and which can be utilized to modify the action of the voltage regulator to maintain or restore the proper load division.

A sensing circuit 11 is provided for each generator and since these circuits may be identical only one has been shown in detail in FIG. 1. As there shown, each sensing circuit 11 includes a capacitor 12 and a resistor 13 which are connected in series across the current transformer loop circuit to be energized by the signal current derived from the loop circuit as described above. The sensing circuit 11 also includes a first transformer 14 and a second transformer 15. The transformer 14 has a primary winding 16 which is connected across the capacitor 12 and has three secondary windings 17, 18 and 19. The transformer 15 has a primary winding 20 connected across the resistor 13 and has two secondary windings 21 and 22. The secondary winding 17 of transformer 14 has twice as many turns as each of the secondary windings 18 and 19 which have the same number of turns. The windings 17, 18 and 19 are wound and connected to have relative instantaneous polarities as indicated by the dots in FIG. 1, that is, the windings 18 and 19 have the same instantaneous polarity which is opposite to that of the winding 17. The secondary windings 21 and 22 of transformer 15 both have the same number of turns and are wound and connected to have opposite instantaneous polarities, as indicated by the dots in FIG. 1, and these two windings preferably have a number of turns equal to 0.866 times the number of turns of the secondary winding 17 of transformer 14 if the resistance of resistor 13 is equal to the reactance of capacitor 12.

The voltage regulator 7 is connected to sense the output voltage of the generator 1 by means of three leads 23, 24 and 25. These leads may be connected directly to the generator terminals, as shown, or they may be connected through a suitable potential transformer if desired. The secondary windings of the transformers 14 and 15 are connected in the voltage sensing leads 23, 24 and 25 to modify the voltages to which the regulator responds under unbalanced reactive load conditions in order to cause the regulator to operate in a manner to maintain or restore balanced conditions. For this purpose, the secondary winding 17 of transformer 14 is connected in series in the lead 25 which is connected to the phase of the generator 1 in which the current transformer 8 is connected. The secondary winding 18 of the transformer 14 and the secondary winding 21 of the transformer 15 are connected in series in the lead 24 to a second phase of the generator, and the secondary windings 19 and 22 of transformers 14 and 15 are connected in series in the lead 23 to the third phase of the generator 1.

The operation of this circuit may be explained by reference to the vector diagram of FIG. 2. Under normal balanced conditions no signal current will flow from the current transformer loop circuit, and the primary windings of the transformers 14 and 15 will not be energized so that no voltages are induced in their secondary windings. Under these conditions, the voltage regulator 7 responds directly to the terminal voltages of the generator and operates in its normal manner to maintain the desired output voltage.

If the reactive load becomes unbalanced, a signal current will flow from the current transformer loop as explained above. If it is assumed that the generator 1 becomes overexcited for any reason, and tends to supply more than its share of the reactive load current, the conditions will be as shown in FIG. 2, if real load currents are balanced or absent. With a signal current flowing from the current transformer loop circuit 9, 10, the capacitor 12 and resistor 13 are energized by the signal current. Since the primary winding 16 of transformer 14 is energized from the capacitor 12, the secondary windings 17, 18 and 19 will have voltages induced in them in quadrature with the signal current. The transformer 15 has its primary winding 20 energized from the resistor 13 and the secondary voltages of the windings 21 and 22 therefore will be in phase with the signal current.

Figure 2:
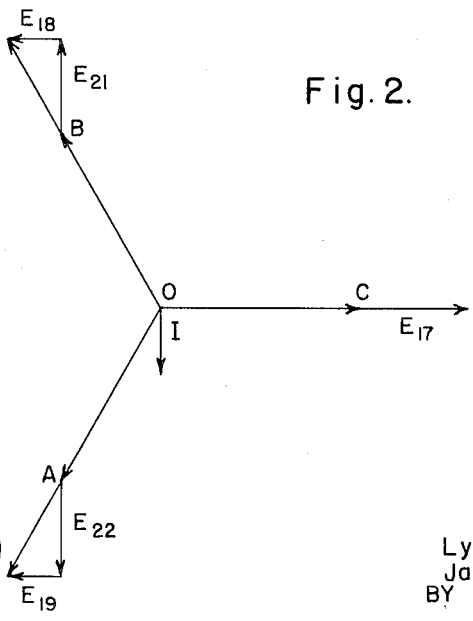
FIG. 2 is a vector diagram illustrating the operation of the circuit of FIG. 1.

The vector relations of these voltages will be as shown in the diagram of FIG. 2, in which the vectors OA, OB and OC represent the respective phase voltages of the generator and the vector I represents the signal current. The voltages of the various secondary windings of the transformers 14 and 15 are designated in FIG. 2 by the letter E with subscripts corresponding to the reference numerals of FIG. 1. It will be seen that because of the relations of the polarities and numbers of turns of the secondary windings described above, the secondary windings 19 and 22 produce a resultant voltage in phase with the generator voltage OA which adds directly to it as shown. Similarly, the voltages of the secondary windings 18 and 21 produce a resultant voltage in phase with the generator voltage OB which adds directly to it. The voltage of the secondary winding 17 is in phase with the generator voltage OC and its magnitude is equal to the resultant voltages of the other two sets of secondary windings. Thus the effect of the sensing circuit 11 under this condition, where the generator 1 is supplying more than its share of reactive load, is to produce polyphase output voltages of equal magnitudes which are in phase with the generator voltages and which add directly to the voltages sensed by the voltage regulator so that the voltage to which the regulator responds is increased. The regulator therefore acts to reduce the generator excitation to restore a balanced load condition.

If the generator 1 were taking less than its share of the reactive load, the voltages of the secondary windings 17, 18, 19, 21 and 22 would be shifted in phase by 180°. Thus the resultant voltages of FIG. 2 would be reversed in phase position and would subtract directly from the generator phase voltages. The voltages to which the voltage regulator responds would thus be reduced, and the regulator would operate to increase the generator excitation to cause the generator to increase its share of the load to restore balanced conditions. Thus in a system such as that shown in FIG. 1, for example, if one generator takes more than its share of the load while the second generator is supplying less than its share, the operation of the sensing circuits 11 causes the regulator of the first generator to reduce its excitation and the regulator of the second generator to increase its excitation, thus maintaining or restoring the desired balanced conditions.

The sensing circuit 11 responds in the manner described above to reactive load components of the signal current derived from the current transformer loop circuit. If real current is present, either with or without reactive components, the vectors representing the secondary voltages of the transformers 14 and 15 due to real current are shifted by 90° in FIG. 2. The resultant voltages are similarly shifted 90° from the positions shown in FIG. 2 so that they are in quadrature relation with the generator voltages. It will be apparent that the magnitude of the voltages to which the regulator responds is essentially unchanged by real current components, although they are shifted in phase. The relative phase positions of the voltages applied to the regulator, however, are unchanged and since their magnitude is essentially unchanged, the presence of real load components in the current transformer loop circuit has substantially no effect on the regulators. The sensing circuit is therefore relatively insensitive to real load components which is an important requirement. In some instances, however, where the power sources of the system involve static inverters or frequency changers, the shift in phase of the voltages applied to the regulator may be used to control the power source to correct the real load unbalance.

It will be seen that this circuit has many advantages. One important advantage results from the arrangement of the secondary windings on the transformers 14 and 15. In many voltage regulators, a half-wave rectifier provided as part of the regulator sensing circuit and in this case a component of direct current will flow in the same direction in all three phases. In the transformer 14, the secondary windings 18 and 19 each have half as many turns as the winding 17 and they are both of opposite instantaneous polarity to the winding 17. Thus any direct current components flowing in these windings cancel out and produce no net flux in the transformer. Similarly, in the transformer 15 the secondary windings 21 and 22 have the same number of turns and are of opposite instantaneous polarity so that the direct current components cancel out. Thus there is no tendency towards saturation of the transformer cores because of direct current components in the secondary windings, so that the outputs of the transformers 14 and 15 are extremely linear and the necessary size of the cores is reduced to a minimum.

The new sensing circuit is universal in application since it can be used with any type of voltage regulator and can be used with any type of regulation whether the response is to average voltage or to the highest phase voltage. It will also be noted that the circuit inherently provides selective operation, since the response to an overexcitation condition is to increase the voltage applied to the regulator and the response to an underexcitation condition is to decrease the voltage. In this way, the output of the sensing circuit distinguishes between overexcitation and underexcitation, so that it is inherently selective and can be used to energize a relay or other protective device, instead of a regulator, to provide protection against over or underexcitation resulting from excitation faults, in the manner shown in the above-mentioned Reeder et al. Patent 2,883,-561, for example.

The same sensing circuit can also be used to respond to unbalance of real load, instead of reactive load, if desired, merely by interchanging the capacitor 12 and resistor 13 in the circuit and reversing the polarity of primary winding 16 of transformer 14 with respect to the secondary windings 17, 18 and 19. The effect of this is to shift the secondary voltages of the transformers 14 and 15 each by 90°. Referring to FIG. 2, if the signal current vector I is shifted 90° so that it is in phase with the vector OC, to represent the real component of the signal current, it will be seen that the transformer output voltages will be as shown in FIG. 2 because of the 90° shift in these voltages with respect to the signal current. Thus, the output voltages of the sensing circuit, when the capacitor 12 and resistor 13 are interchanged, will modify the voltages to which the regulator responds in case of real load unbalance in the same way as previously described for reactive load unbalance. The same circuit therefore can be used to sense either real or reactive load unbalance and can readily be changed from one type of response to the other.

The new sensing circuit requires only four components, that is, two transformers, a capacitor and a resistor, which can be made of small size and weight and which are highly reliable devices. The power dissipated in the circuit is very low and a device of small size and light weight but high reliability is thus provided. The circuit has the further advantage that it utilizes the current transformer loop circuit which is widely used in parallel systems so that no redesign or rearrangement of existing circuits is required. The sensitivity of the sensing circuit to load unbalance can easily be adjusted by adjustment of the transformer turns ratio, or of the impedances of the resistor and capacitor, or by a combination of these.

The new sensing circuit thus has many advantages and is truely universal in application, and meets all requirements of load division sensing circuits for all types of regulators, regulation systems and protective systems.

As previously indicated, there are cases where a reactive load unbalance detector is desired which has the characteristics and advantages of the circuit described above, to meet the requirements of particular regulation systems, and in which it is also desired that the sensing circuit provide a direct current output signal with polarity determined by the direction of unbalance and magnitude proportional to the magnitude of the unbalance.

The embodiment of the invention shown in FIG. 3 provides these additional characteristics. This embodiment of the invention is shown applied to a parallel system of the same type as that of FIG. 1, and corresponding elements of the system have been designated by the same reference numerals. The sensing circuit 30 of FIG. 3 is the same for each of the paralleled generators, or other power sources, and has been shown in detail for only one of the generators.

The sensing circuit 30 includes a capacitor 31 and resistor 32 which are connected in series to the current transformer loop 9–10. A first transformer 33 is provided having a primary winding 34 connected across the capacitor 31, and a second transformer 35 is provided having a primary winding 36 connected across the resistor 32. The transformer 33 has two sets of secondary windings. The secondary windings 37, 38 and 39 correspond, respectively, to the secondary windings 17, 18 and 19 of FIG. 1, that is, the winding 37 has twice as many turns as each of the windings 38 and 39 with relative polarities as indicated. The second set of secondary windings 37', 38' and 39' are identical to the corresponding windings of the first set but are wound and connected to have opposite instantaneous polarities as indicated. The transformer 35 also has two sets of secondary windings. The windings 40 and 41 correspond, respectively, to the windings 21 and 22 of FIG. 1, and have opposite instantaneous polarities, as indicated, with the same number of turns, which is equal to 0.866 times the number of turns of the winding 37 if the impedances of capacitor 31 and resistor 32 are equal. The second set of secondary windings of the transformer 35 consists of windings 40' and 41' which are identical to the windings 40 and 41 but with opposite instantaneous polarities as indicated.

As in FIG. 1, the two sets of secondary windings of the transformers 33 and 35 are connected in the sensing leads 42, 43, and 44 which are connected to the three phases of the generator 1, either directly as shown or through a potential transformer. The secondary winding 37 is connected in series with the lead 44 to the phase of the generator in which the current transformer 8 is connected. The secondary windings 38 and 40 are connected in series with the lead 43 to a second phase of the generator, and the windings 39 and 41 are connected in series with the lead 42 to the third phase of the generator. The second sets of secondary windings, that is, windings 37', 38' and 39' of the transformer 33, and windings 40' and 41' of the transformer 35 are similarly connected to the same sensing leads as the corresponding windings of the first set.

The voltages of the secondary windings of the transformers are thus added to the phase voltages of the generator in a manner similar to that described in connection with FIG. 1. In this embodiment of the invention, however, the three voltages obtained from the first set of secondary windings are rectified by three diodes 45, which form a three-phase half-wave rectifier, and applied to a resistor 46. The voltages obtained from the second set of secondary windings are similarly rectified by three diodes 47, also connected as a three-phase half-wave rectifier, and applied to a second resistor 48. The resistors 46 and 48 are connected across the rectified output voltages of the two sets of secondary windings, as shown, with the junction between the resistors preferably grounded as indicated at 49. The resultant voltage across the two resistors 46 and 48 in series is the direct current output voltage of the sensing circuit and is applied to the voltage regulator 7 through leads 50 and 51.

As illustrated by the vector diagrams of FIGS. 4 and 5, each set of transformer secondary windings operates in the same manner as previously described in connection with FIG. 1. Thus, under normal conditions with balanced loads, no current flows from the current transformer loop to the sensing circuit, and no voltages appear across the secondary windings of the transformers 33 and 35. Under these conditions, the generator output voltages are rectified by the diodes 45 and 47 and equal and opposite voltages appear across the resistors 46 and 48, so that no voltage is applied to the regulator through the leads 50 and 51.

If a reactive load unbalance appears, due to overexcitation of the generator 1 for example, the effect in each set of secondary windings is similar to that previously described, as shown in FIG. 4. If the generator is supplying more than its share of reactive current, the voltages of the windings 39 and 41 produce a resultant voltage $E_1$, similar to the resultant of the voltages $E_{19}$ and $E_{22}$ in FIG. 2, which is in phase with the generator voltage OA and adds directly to it. Similarly the windings 38 and 40 produce a resultant voltage $E_2$ which adds directly to the generator voltage OB, and the voltage $E_3$ of the winding 37 adds directly to the voltage OC. The second sets of secondary windings on the transformers 33 and 35, however, produce voltages which are 180° out of phase with the voltages of the first set of secondary windings. The windings 39' and 41' thus produce a resultant voltage $E_4$ which is of the same magnitude as the voltage $E_1$ but 180° out of phase with it so as to subtract from the voltage OA. Similarly, the windings 38' and 40' produce a resultant voltage $E_5$ which subtracts directly from the voltage OB, and the winding 37' produces a voltage $E_6$ which subtracts directly from the voltage OC. The rectified output voltage applied to the resistor 46 is thus greater than the voltage applied to the resistor 48, and a net direct current output of one polarity will appear at the output leads 50 and 51 for application to the voltage regulator. The magnitude of this voltage will depend on the magnitude of the unbalance, since the voltages of the transformer secondary windings are proportional to the amount of unbalance. If the generator 1 is supplying less than its share of reactive load, due to underexcitation, the phase positions of all the secondary winding voltages will be changed by 180°, and a higher voltage will appear across the resistor 48 than across the resistor 46. The polarity of the output voltage to the leads 50 and 51 will therefore be opposite to the previous case. Thus the output voltage of the sensing circuit 30 is a direct current voltage of polarity determined by the direction of unbalance and of magnitude determined by the magnitude of the unbalance.

If there are real load components in the signal current derived from the current transformer loop, the resultant voltages produced by the transformer secondary windings will be in quadrature with the voltages produced by reactive load components, and the resultant voltages will appear as shown in FIG. 5 in which the corresponding voltages are designated by primed reference characters. It will be seen that these voltages cancel out in each phase so that there is no effect on the generator voltages and the circuit is completely insensitive to real load components.

It will be apparent that the circuit of FIG. 3 has the same advantages as those described above in connection with the circuit of FIG. 1. Thus, any direct current components in the transformer secondary windings due to the rectifier cancel out in the manner previously described so that there is no problem of saturation of the transformer cores. The circuit is universal in its application as it can be used with any type of regulator or regulating system where a direct current signal is desired. The circuit can be used to respond to real load unbalance in the manner as previously described in connection with FIG. 1, and the sensitivity is readily adjustable in the same manner. The circuit of FIG. 3 therefore makes it possible to obtain a direct current output from the load unbalance sensing circuit with polarity determined by the direction of unbalance and magnitude determined by the magnitude of the unbalance. The circuit inherently provides selectivity since the polarity of the output signal changes with the direction of unbalance, and it can therefore be utilized to control a protective relay if desired to provide protection against excitation faults or other conditions causing a sustained condition of unbalanced real or reactive load.

It should now be apparent that a load division sensing circuit has been provided which has many advantages since it is universal in application and can be made of small size with high reliability. The sensing circuit in either of the embodiments described is readily adjustable and can be made to respond to either real or reactive load unbalance with minimum sensitivity to the other component.

Certain specific embodiments of the invention have been shown and described for the purpose of illustration, but it will be apparent that other embodiments and modifications are possible within the scope of the invention, and the invention is not limited to the specific circuits shown but in its broadest aspects it includes all equivalent embodiments and modifications.

We claim as our invention:

1. In a system including a plurality of polyphase alternating current power sources operating in parallel, means for producing a signal current proportional to the difference in load currents of said power sources, and a voltage sensing circuit for each power source, each of said voltage sensing circuits including means for deriving a plurality of voltages from said signal current having predetermined phase relations thereto, and means for combining said derived voltages with the phase voltages of the power source to add vectorially thereto.

2. In a system including a plurality of polyphase alternating current power sources operating in parallel, means for producing a signal current proportional to the difference in load currents of said power sources, and a voltage sensing circuit for each power source, each of said voltage sensing circuits including means for deriving a plurality of voltages in phase with said signal current and in quadrature with said signal current, and means for combining said derived voltages with the phase voltages of the power source to add vectorially thereto.

3. In a system including a plurality of polyphase alternating current power sources operating in parallel, means for producing a signal current proportional to the difference in load currents of said power sources, and a voltage sensing circuit for each power source, each of said voltage sensing circuits including a capacitor and a resistor connected to be energized by said signal current, and transformer means for deriving voltages from the voltage across said capacitor and from the voltage across said resistor and for combining said derived voltages with the phase voltages of the power source to add vectorially thereto.

4. In a system including a plurality of polyphase alternating current power sources operating in parallel, means for producing a signal current proportional to the difference in load currents of said power sources, a voltage responsive device associated with each power source to respond to the voltage thereof, and a voltage sensing circuit for each power source, each of said voltage sensing circuits including means for deriving a plurality of voltages in phase with said signal current and in quadrature with said signal current, and means for combining said derived voltages with the phase voltages of the power source to add vectorially thereto to modify the voltage to which said voltage responsive device responds.

5. In a system including a plurality of polyphase alternating current power sources operating in parallel, means for producing a signal current proportional to the difference in load currents of said power sources, a voltage responsive device associated with each power source to respond to the voltage thereof, and a voltage sensing circuit for each power source, each of said voltage sensing circuits including a capacitor and a resistor connected to be energized by said signal current, and transformer means for deriving voltages from the voltage across said capacitor and from the voltage across said resistor and for combining said derived voltages with the phase voltages of the power source to add vectorially thereto to modify the voltage to which said voltage responsive device responds.

6. In a system including a polyphase alternating current power source operating in parallel with at least one other power source, means for producing a signal current proportional to the difference in load currents of the power sources, and a load division sensing circuit including first transformer means for producing a plurality of voltages in phase with said signal current, second transformer means for producing a plurality of voltages in quadrature relation with said signal current, and means for combining the voltages of said first and second transformer means with the phase voltages of said power source to add vectorially thereto.

7. In a system including a polyphase alternating current power source operating in parallel with at least one other power source, means for producing a signal current proportional to the difference in load currents of the power sources, and a load division sensing circuit including a resistor and a capacitor connected to be energized by said signal current, first transformer means having a primary winding energized by the voltage across said resistor and having a plurality of secondary windings, second transformer means having a primary winding energized by the voltage across said capacitor and having a plurality of secondary windings, and means for combining the voltages of said secondary windings of the first and second transformer means with each other and with the phase voltages of the power source to add vectorially thereto.

8. In a system including a polyphase alternating current power source operating in parallel with at least one other power source, means for producing a signal current proportional to the difference in load currents of the power sources, and a load division sensing circuit including a resistor and a capacitor connected to be energized by said signal current, first transformer means having a primary winding energized by the voltage across said resistor and having two secondary windings of opposite instantaneous polarities, second transformer means having a primary winding energized by the voltage across said capacitor and having two secondary windings of the same instantaneous polarity and a third secondary winding of opposite instantaneous polarity, means for connecting one of said two secondary windings of the first transformer means and one of said two secondary windings of the second transformer means to each other and to one phase of the power source, means for connecting the other of the two secondary windings of the first transformer means and the other of said two secondary windings of the second transformer means to each other and to a second phase of the source, and means for connecting the third secondary winding of the second transformer means to a third phase of the source.

9. In a system including a polyphase alternating current power source operating in parallel with at least one other power source, means for producing a signal current proportional to the difference in load currents of the power sources, and a load division sensing circuit including a resistor and a capacitor connected to be energized by said signal current, first transformer means having a primary winding energized by the voltage across said resistor and having two equal secondary windings of opposite instantaneous polarities, second transformer means having a primary winding energized by the voltage across said capacitor and having two equal secondary windings of the same instantaneous polarity and a third secondary winding having twice as many turns as each of the other two secondary windings of the second transformer means and of opposite instantaneous polarity, means for connecting one of said two secondary windings of the first transformer means and one of said two secondary windings of the second transformer means to each other and to one phase of the power source, means for connecting the other of the two secondary windings of the first transformer means and the other of said two secondary windings of the second transformer means to each other and to a second phase of the source, and means for connecting the third secondary winding of the second transformer means to a third phase of the source.

10. In a system including a polyphase alternating current power source operating in parallel with at least one other power source, means for producing a signal current proportional to the difference in load currents of the power sources, and a load division sensing circuit including first transformer means for producing two sets of voltages in phase with said signal current but of opposite instantaneous polarities, second transformer means for producing two sets of voltages in quadrature relation with said signal current but of opposite instantaneous polarities, and means for separately combining corresponding sets of voltages of the first and second transformer means with the phase voltages of said power source to add vectorially thereto.

11. In a system including a polyphase alternating current power source operating in parallel with at least one other power source, means for producing a signal current proportional to the difference in load currents of the power sources, and a load division sensing circuit including first transformer means for producing two sets of voltages in phase with said signal current but of opposite instantaneous polarities, second transformer means for producing two sets of voltages in quadrature relation with said signal current but of opposite instantaneous polarities, means for separately combining corresponding sets of voltages of the first and second transformer means with the phase voltages of said power source to add vectorially thereto, separate rectifier means for rectifying the two sets of phase voltages thus obtained, and means for combining the outputs of the rectifier means to obtain an output signal of polarity and magnitude determined by the direction and magnitude of load unbalance between the paralleled sources.

12. In a system including a polyphase alternating current power source operating in parallel with at least one other power source, means for producing a signal current proportional to the difference in load currents of the power sources, and a load division sensing circuit including a resistor and a capacitor connected to be energized by said signal current, first transformer means having a primary winding energized by the voltage across said resistor and having two sets of secondary windings for producing voltages in phase with the signal current but of opposite instantaneous polarities, second transformer means having a primary winding energized by the voltage across said capacitor and having two sets of secondary windings for producing voltages in quadrature relation with the signal current but of opposite instantaneous polarities, and means for separately combining the voltages of corresponding sets of secondary windings of the first and second transformer means with the phase voltages of said power source to add vectorially thereto.

13. In a system including a polyphase alternating current power source operating in parallel with at least one other power source, means for producing a signal current proportional to the difference in load currents of the power sources, and a load division sensing circuit including a resistor and a capacitor connected to be energized by said signal current, first transformer means having a primary winding energized by the voltage across said resistor and having two sets of secondary windings for producing voltages in phase with the signal current but of opposite instantaneous polarities, second transformer means having a primary winding energized by the voltage across said capacitor and having two sets of secondary windings for producing voltages in quadrature relation with the signal current but of opposite instantaneous polarities, means for separately combining the voltages of corresponding sets of secondary windings of the first and second transformer means with the phase voltages of said power source to add vectorially thereto, separate rectifier means for rectifying the two sets of phase voltages thus obtained, and means for combining the outputs of the rectifier means to obtain an output signal of polarity ond magnitude determined by the direction and magnitude of load unbalance between the paralleled sources.

References Cited by the Examiner
UNITED STATES PATENTS

| | | | |
|---|---|---|---|
| 2,717,318 | 9/1955 | Keith | 307—57 X |
| 2,972,058 | 2/1961 | Kahle | 307—57 |
| 2,986,647 | 5/1961 | Britten | 307—57 |
| 3,185,857 | 5/1965 | Johnson | 307—57 |

References Cited by the Applicant
UNITED STATES PATENTS

| | | |
|---|---|---|
| 2,843,760 | 7/1958 | Kahle. |
| 2,883,561 | 4/1959 | Reeder et al. |

ORIS L. RADER, *Primary Examiner.*

T. J. MADDEN, *Assistant Examiner.*